United States Patent [19]

Craver et al.

[11] 4,400,874

[45] Aug. 30, 1983

[54] WIRING CONNECTOR PLUGS TO PRODUCE A WIRE MULT

[75] Inventors: Edward H. Craver, Clemmons; Samuel Pinnolis, Winston-Salem, both of N.C.

[73] Assignee: Western Electric Company, New York, N.Y.

[21] Appl. No.: 288,438

[22] Filed: Jul. 30, 1981

[51] Int. Cl.$^3$ ...................... H01R 43/00; B23P 19/00

[52] U.S. Cl. ...................... 29/861; 29/754; 29/755; 29/748; 140/93 R

[58] Field of Search ................ 29/861, 857, 854, 748, 29/749, 750, 751, 753, 755, 850, 704, 564.6, 566.4; 174/84 C; 339/97 P, 98, 99 R, 198 R; 140/93 R, 92.1

[56] References Cited

U.S. PATENT DOCUMENTS

| | | | |
|---|---|---|---|
| 3,145,261 | 8/1964 | Forney, Jr. | 339/98 X |
| 3,394,454 | 7/1968 | Logan | 339/97 P X |
| 3,866,296 | 2/1975 | Tucci | 29/753 X |
| 3,930,524 | 1/1976 | Tarbox | 29/755 X |
| 4,066,317 | 1/1978 | Bierenfield et al. | 339/98 X |
| 4,074,421 | 2/1978 | Reutling et al. | |
| 4,144,633 | 3/1979 | Tucci . | |

*Primary Examiner*—Francis S. Husar
*Assistant Examiner*—Carl J. Arbes
*Attorney, Agent, or Firm*—D. D. Bosben

[57] ABSTRACT

In the wiring of connector plugs (18) to produce a wire mult, a wire (16) is first positioned in a terminal guide slot (32) on one side of a first connector plug (18) and then offset-dressed about a camming pin (52) of a wire insertion-and-slack forming tool (50) into alignment with a wire strain-relief slot (38) on an opposite side of the plug. Operation of the tool (50) then inserts the wire (16) into a terminal (24) on the one side of the first connector plug (18) and forms slack in the wire between the first connector plug and a second connector plug (18). The tool (50) next inserts the wire (16) into the wire strain-relief slot (38) of the first connector plug (18) and a terminal guide slot (38) on one side of the second connector plug (18) substantially simultaneously. The tool (50) includes dual air cylinders (64 and 66) and respective wire-engaging blades (54 and 56) which operate in sequence to perform the multing operation.

17 Claims, 13 Drawing Figures

WIRING CONNECTOR PLUGS TO PRODUCE A WIRE MULT

TECHNICAL FIELD

This invention relates to a method and apparatus for writing of connector plugs to produce a wire mult, and more particularly to a method and apparatus for wiring connector plugs to produce a wire mult without stretching the wires during the wiring operation.

BACKGROUND OF THE INVENTION

Backplane assemblies used in electronic equipment, such as telecommunications transmission bays, generally utilize a backplane having rows of connector plugs mounted in openings in the backplane. Each connector plug may have two rows of electrical terminals mounted in a molded plastic body, with first ends of the terminals being located in spaced opposed relationship on opposite sides of a slot in the body of the connector plug for receiving a substrate, such as a printed circuit board. Second opposite ends of the terminals, which are of bifurcated construction for the reception of electrical conductor wires, are aligned with respective wire guide slots in the molded plastic body. The molded plastic body also includes wire strain-relief slots on opposite sides of the body between the terminals. The printed circuit boards are interconnected to one another and to other associated electronic equipment in the transmission bay by the electrical conductor wires, which are dressed between the connector plugs on the backplane and inserted in the terminals of the connector plugs to produce a wiring arrangement referred to in the art as a ∓wire mult."

In dressing the electrical conductor wires between the connector plugs in one of the connector plug rows of the backplane assembly and inserting the wires into the terminals of the connector plugs to produce the wire mult, since the connector plugs are capable of limited movement in their respective openings in the backplane, it is necessary that the wires be provided with slack portions between the connectors to preclude the placing of undue strain on the wires during the insertion process and/or in subsequent use of the backplane assembly in the field. In the past this has been accomplished by initially inserting the wire in a strain-relief slot of a first connector plug and then threading the wire through an air-operated hand dressing-and-insertion tool so that the wire is captured in the tool. The tool then is positioned over the first connector plug in the connector plug row. Upon actuation of an air cylinder of the tool, the tool then sequentially inserts the wire into one of the terminals of the first connector plug, forms slack between the first connector plug and a next connector plug, and inserts the wire into a strain-relief slot of the next connector plug. The tool then is positioned over the next connector plug and the same sequence of events is repeated for this connector plug and the next adjacent connector plug. The same procedure is repeated for each connector plug in the row until the wire has been connected to each of the connector plugs. This procedure is disadvantageous, however, because the insertion of the wire into each terminal after the wire has been secured against movement in its associated strain-relief slot frequently tends to place undesirable stress on the wire, causing stretching of the wire.

Accordingly, a primary purpose of this invention is to provide new and improved apparatus for inserting a wire into connector plugs and for dressing the wire between the connector plugs, in the forming of a wire mult, without stretching the wire.

SUMMARY OF THE INVENTION

In general, this invention involves the wiring of connector plugs to produce a wire mhlt in which a wire is first inserted into a terminal in a first connector plug. Slack then is formed in the wire between the first connector plug and a second connector plug, and a portion of the wire is inserted in a strain-relief slot in the first connector plug.

More specifically, apparatus for wiring connector plugs to produce a wire mult includes a first wire-engaging blade means for inserting a wire into the terminals of the connector plugs, the first wire engaging blade means being operated by a first air cylinder. Additional wire-engaging blade means, for producing slack in the wire between the connector plugs, for inserting the wire into the strain-relief slots of the connector plugs, and for inserting the wire into terminal guide slots of the connector plugs, respectively, are operable as a unit by a second air cylinder after the wire has beem inserted into each of the connector plug terminals. A camming means, which is offset with respect to the first wire engaging blade means, is provided for aligning the wire in the strain-relief slots. The apparatus further includes an elongated nest member which is positionable on top of each of the connector plugs in a wire-multing operation, and on which a housing for supporting the wire-engaging blade means is slidable for aligning the wire-engaging blade means with the terminals, terminal guide slots and wire strain-relief slots of the connector plugs.

DETAILED DESCRIPTION

Referring to FIGS. 1–4, the subject invention involves the insertion of a plurality of wires 16 (one shown in FIGS. 2–4) in connector plugs 18 mounted in openings 19 in a backplane 20 (shown in phantom on FIGS. 2–4), to produce a wire mult. Normally, the backplane 20 supports two rows of the connector plugs 18 in spaced parallel relationship, and other associated input-output connectors (not shown), in a known manner. In use, the backplane 20 and the connector plugs 18 therein are supported at the back of a transmission bay frame for the reception of printed circuit boards (not shown) in the connector plugs. The backplane 20 may be of unitary molded plastic construction, as for example of the type disclosed in the U.S. patent application Ser. No. 130,497 of J. O. Etchison et. al., filed Mar. 14, 1980, now Patent No. 4,353,614, and assigned to the same assignee, the disclosure of which is hereby incorporated by reference.

Figure 1:
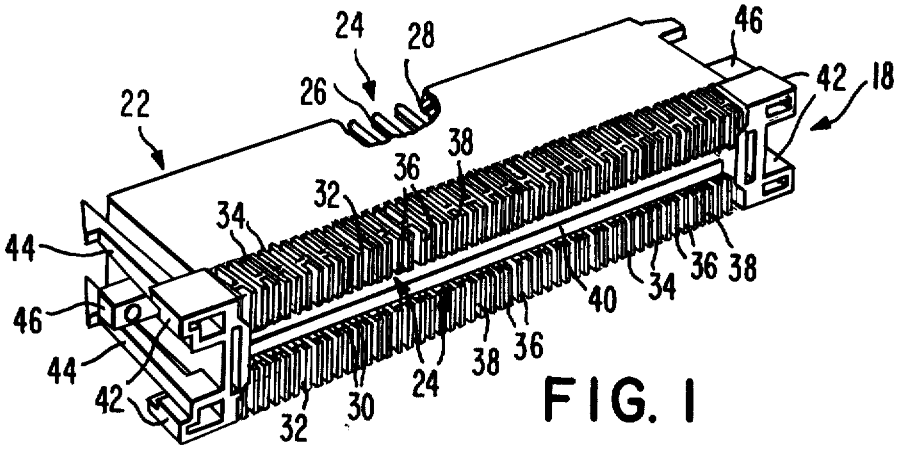
FIG. 1 is an isometric view of a connector plug with which the subject invention may be utilized.
Figure 2:
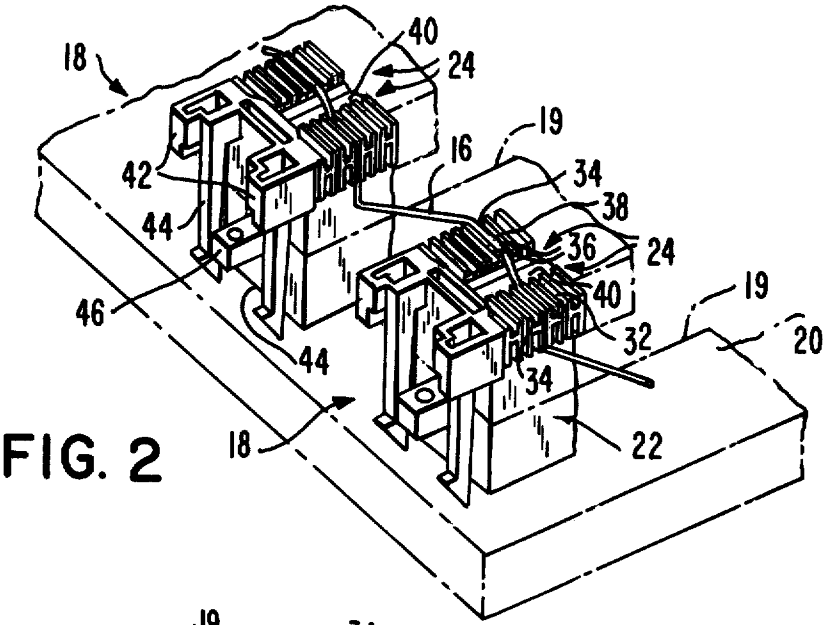
FIG. 2 is an isometric view of a plurality of the connector plugs shown in FIG. 1, mounted in a backplane.
Figure 3:
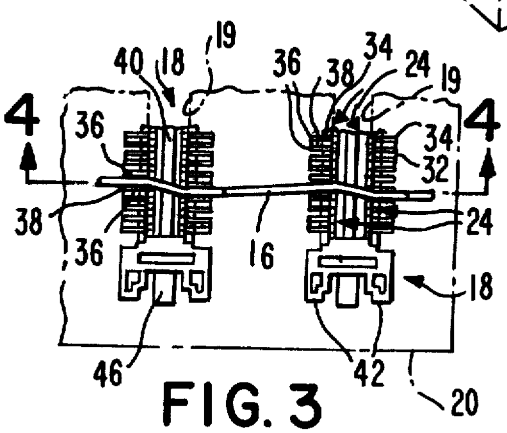
FIG. 3 is a partial plan view of the connector plugs shown in FIG. 2.
Figure 4:
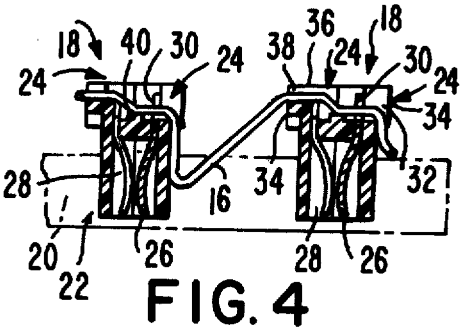
FIG. 4 is a cross-sectional view taken along the line 4—4 in FIG. 3.

Referring to FIG. 1, each of the connector plugs 18, which may be of any suitable construction, is shown as being of a snap-in type which includes a molded plastic body 22 having two spaced rows of electrical terminals 24 mounted therein. At one end each of the terminals 24 includes a contact blade portion 26 for making contact with a contact finger on a printed circuit board (not shown) when the board is inserted in an elongated slot 28 formed in the body 22 of the connector plug. At its other end each of the terminals 24 includes an insulation-displacement contact portion 30 for making electrical contact with one of the wires 16 when the wire is inserted into spaced fingers of the contact portion and an aligned terminal guide slot 32 of the connector plug 18. Each terminal guide slot 32 is defined by spaced opposed walls of a respective pair of a series of projections 34 located along each side of the body 22. Each projection 34 also includes a pair of spaced fins 36 which define a wire strain-relief slot 38 at an outer end thereof. A longitudinally extending central reinforcing rib 40 extends between the rows of terminals 24. At each end the connector plug 18 also includes first and second spaced projecting ears 42, with the ears at one end of the plug having snap-in type retaining legs 44, formed integrally therewith. The connector plug 18 also has projecting stop lugs 46 at its opposite ends to limit the extent to which the plug can be inserted into the backplane 20.

Figure 5:
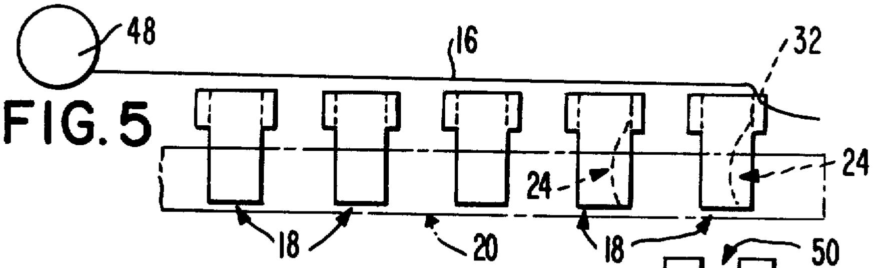
FIGS. 5–10 are schematic views of a series of steps in the forming of a wire mult utilizing a wire-multing tool in accordance with the invention, as viewed from an operator side of the tool.
Figure 6:
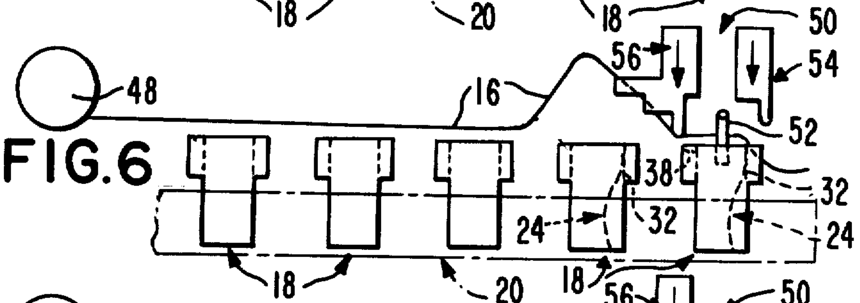
Figure 7:
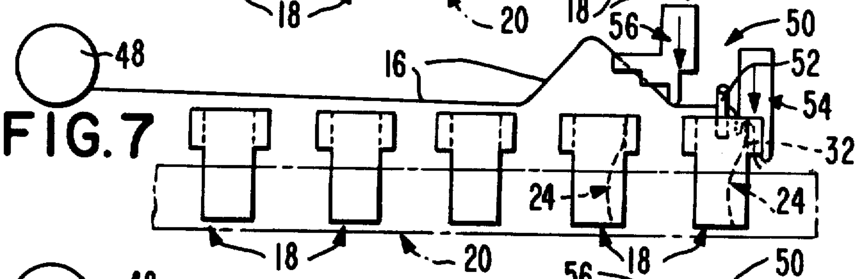
Figure 8:
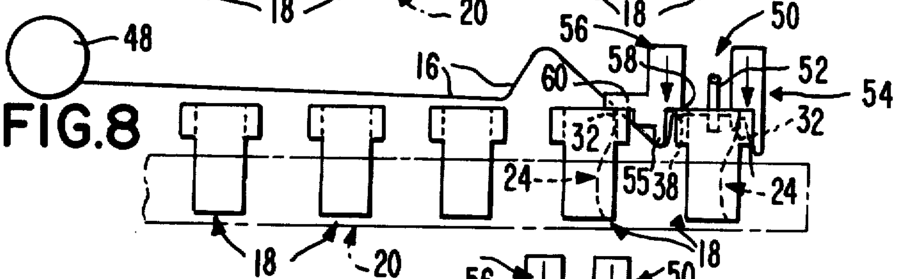

Referring to FIGS. 5–10, which also show a partial row of the connector plugs 18 mounted on the backplane 20, in inserting one of the wires 16 into the connector plugs in the forming of the wire mult, the wire initially is pulled from a supply reel 48 across the connector plugs to a first side of the first connector plug in the row. A first portion of the wire 16 then is manually positioned above the terminal 24 into which the wire is to be inserted, with an adjacent portion of the wire positioned in an upper horizontal portion of the guide slot 32 for the terminal (FIG. 5). Apparatus in the form of a pneumatic wire insertion tool 50 (shown in detail in FIGS. 11–13) then is positioned over the first connector plug 18, with another portion ofthe wire being dressed about a depending offset camming pin 52 (FIG. 6) of the tool, to align the wire with one of the wire strain-relief slots 38 (FIG. 6) on the opposite side of the connector plug. The pneumatic tool 50 then is energized to cause a wire insertion blade 54 and a slack-forming bar 56 to operate in sequence as indicated in FIGS. 7 and 8.

Figure 9:
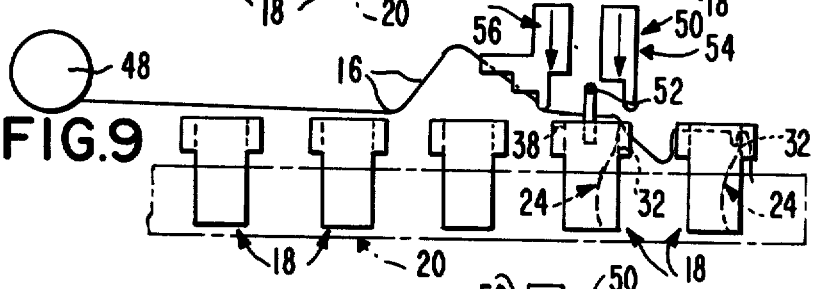
Figure 10:
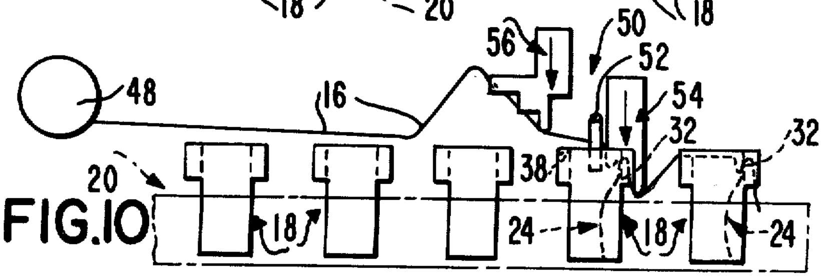

More specifically, the wire insertion blade 54 inserts the first portion of the wire 16 into the terminal 24 and dresses the wire vertically into the associated guide slot 32 (FIG. 7), whereupon the wire slack-forming bar 56 is operated so that a central blade portion 55 (FIG. 8) thereof forms a slack portion in the wire between the first connector plug 18 and the second connector plug 18 (FIG. 8). As the slack-forming bar 56 completes its strode, a second blade portion 58 (FIG. 8) thereof also pushes a portion of the wire 16 into the wire strain-relief slot 38 of the first connector plug 18. At substantially the same time a third blade portion 60 (FIG. 8) on the wire slack-forming bar 56 pushes a portion of the wire 16 into an upper portion of the guide slot 32 for the terminal 24 in the second connector plug 18 into which the wire is to be inserted. The pneumatic wire insertion tool 50 is then positioned on the second connector plug 18 (FIG. 9) and the above steps are repeated, during which the wire insertion blade 54 inherently redresses the slack in the wire 16 between the first and second connector plugs, as illustrated in FIG. 10, as the blade dresses the wire vertically into the guide slot 32. This same procedure is repeated for each connector plug 18 in the row until the wire 16 has been inserted into a respective one of the terminals 24 in each of the connector plugs.

Figure 11:
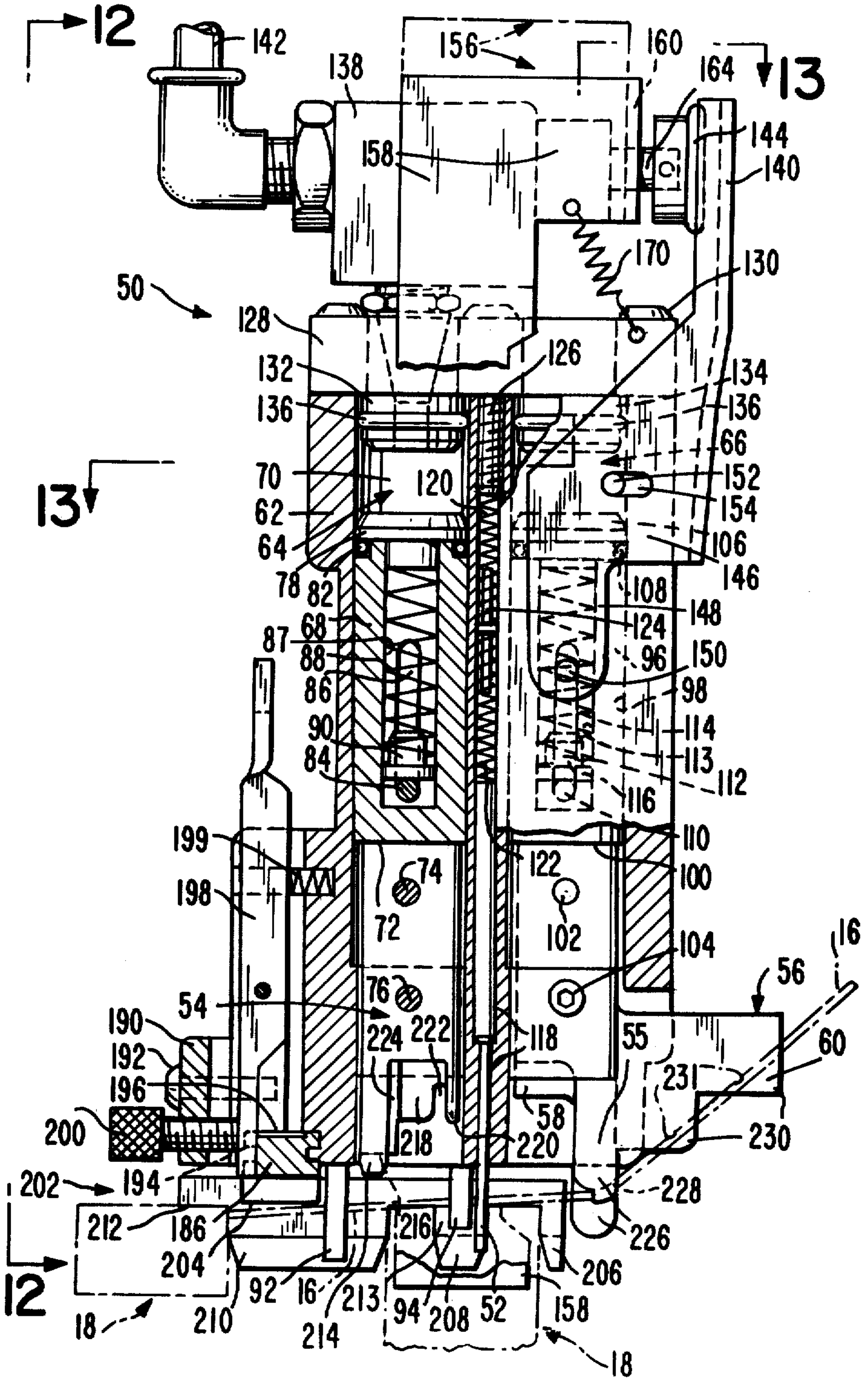
FIG. 11 is a detailed elevational view of the wire-multing tool depicted schematically in FIGS. 5–10, viewed from an opposite side of the tool and partially in cross-section, to facilitate illustration of the construction of the tool.
Figure 12:
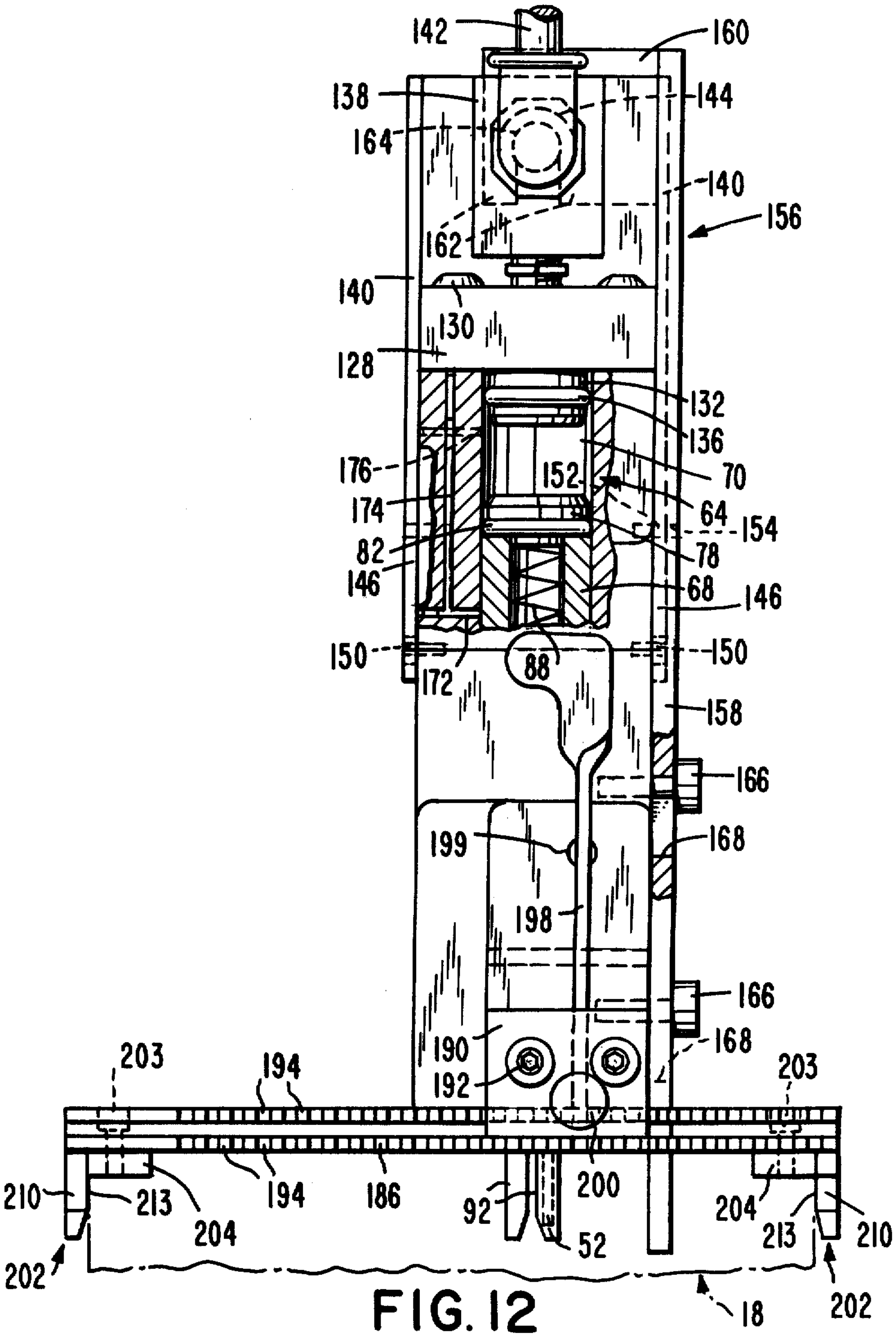
FIG. 12 is a side elevational view of the wire-multing tool as viewed in the direction of the arrows 12–12 in FIG. 11, partially in cross-section.
Figure 13:
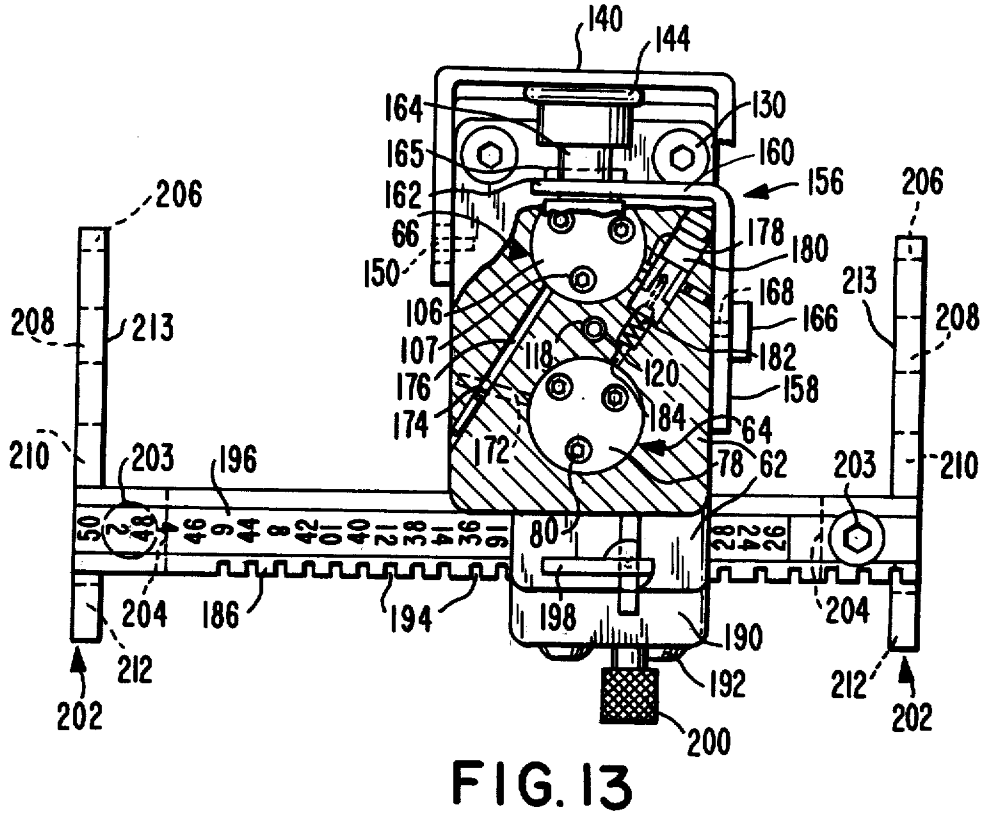
FIG. 13 is a plan view of the wire-multing tool shown in FIGS. 12 and 13, partially in cross-section.

Referring to FIGS. 11–13, the pneumatic wire insertion tool 50 comprises a metal housing 62 in which first and second air cylinders 64 and 66 are integrally formed. For example, the first air cylinder 64 includes a cylindrical plunger 68 mounted for vertical reciprocable movement in a first cylindrical chamber 70 in the housing 62. A lower end of the cylindrical plunger 68 includes a vertical slot 72 in which the wire insertion blade 54 is mounted by a dowel 74 and a cap screw 76. A circular metal cap member 78 is secured to an upper end of the plunger 68 by screws 80 (FIG. 13), with a rubber seal 82 being disposed between the cap member and an annular shoulder on the plunger. A horizontal guide pin 84, having opposite ends thereof mounted in the housing 62, extends through vertical slots 86 in opposite sides of the plunger 68 and across a central cylindrical cavity 87 thereof. A coil spring 88 is disposed in the central cylindrical cavity 87 in the plunger 68 between a reduced cylindrical portion of the cap member 78 and a pressure member 90 resting on the guide pin 84, to bias the plunger into an upward position. The housing 62 also includes first and second pairs of downwardly projecting spaced guide fingers 92 (FIGS. 11 and 12) and 94 (shown only in FIG. 11) for facilitating alignment of the wire 16 (e.g., FIG. 6) with the wire inserting blade 54.

The second air cylinder 66, as in the case of the first air cylinder 64, includes a cylindrical plunger 96 disposed in a second cylindrical chamber 98 in the housing 62 and having a vertical slot 100 in which the wire slack-forming bar 56 is mounted by a dowel 102 and a cap screw 104. The second air cylinder 66 also includes a metal cap member 106 secured to the plunger 96 by screws 107 (FIG. 13), a sealing ring 108, a guide pin 110 mounted in the housing and extending through elongated slots 112 and a central cylindrical cavity 113 in the plunger 96, and a coil biasing spring 114 disposed within the plunger cavity between the cap member and a pressure member 116.

As is best shown in FIG. 11, the offset camming pin 52 of the tool 50 is mounted in a vertical passageway 118 in the housing 62 between the cylindrical chambers 70 and 98. The camming pin 52 is biased downward so as to project from the lower end of the housing 62, by a pair of coil springs 120 and 122, which are separated by an intermediate pin 124 and retained in the housing by an adjustable screw 126 in the upper end of the housing.

A metal cover member 128 is secured to the top of the metal housing 62 by screws 130. The metal cover member 128 has a hollow first metal plug 132 and a solid second metal plug 134 screwthreadably mounted therein above respective ones of the cylindrical chambers 70 and 98 in the housing. Each of the metal plugs 132 and 134 has a rubber O-ring seal 136 mounted thereon in a known manner.

An air valve 138, which is operated by a manual actuating trigger 140, is screw threadably mounted in the hollow plug 132 and is connected to an air supply (not shown) by a flexible air line 142. An upper end portion of the trigger 140 engages an actuating button 144 of the air valve 138, and an intermediate saddle-shaped portion 146 of the trigger straddles the housing 62. Depending legs 148 on the trigger intermediate portion 146 are pivoted at their lower ends on pins 150 projecting from the housing 62, and second pins 152 project from the housing into guide slots 154 in the intermediate portion.

A trigger safety stop, in the form of a vertically disposed bar member 156, includes a vertical main leg 158 and a laterally projecting horizontal leg 160 having an inverted generally U-shaped portion 162 (FIG. 12 and 13). The U-shaped portion 162 straddles a stem 164 of the air valve 138 between a housing of the air valve and the actuating button 144 to limit inadvertent operating movement of the actuating button and the trigger 140 when the tool 50 is not mounted on one of the connector plugs 18 for a wire-inserting operation. The vertical leg 158 is slidably mounted on one side of the housing 62 by screws 166 (FIG. 12 and 13) disposed in slots 168 (FIG. 12) in the leg. The vertical leg 158 projects below the housing so that when the tool 50 is positioned on one of the connector plugs 18 the safety stop 156 is moved upward by engagement with the top of the connector plug to disengage the U-shaped portion 162 from the air valve stem 164. The safety stop 156 is biased downward by a coil spring 170 (FIG. 11) connected between the cover member 128 and the vertical leg 158.

Referring to FIGS. 12 and 13, as the cylindrical plunger 68 of the first air cylinder 64 reaches the lower limit of its stroke during a wire-inserting operation, the plunger uncovers a lower horizontal air passage 172 in the housing 62. Air from the air valve 138 then is passed through the horizontal passage 172, upward through a vertical passage 174 in the housing 62, and through an upper horizontal passage 176 in the housing, into the upper end of the second air cylinder 66 (FIG. 13) to cause operation of the wire slack-forming bar 56 (FIG. 11). Referring further to FIG. 13, at the completion of the downstroke of the wire slack-forming bar 56, upon release of the trigger 140 air in the first air cylinder 64 exhausts through the air valve 138 in a normal manner, while air in the second air cylinder 66 exhausts through a first horizontal exhaust passage 178 in the housing 62, a check valve 180 having a spring-loaded ball seal 182, and a second horizontal exhaust passage 184 in the housing, into the first air cylinder.

The lower end of the housing 62 is slidably mounted on an elongated index bar 186 in a known manner by a tongue-and-groove connection comprising tongue portions on the index bar received in respective grooves in the housing and in a guide member 190 secured to the housing by screws 192. The index bar 186 has sets of upper and lower notches 194 formed therein, with one set of notches being provided for each of the pairs of aligned terminals 24 in one of the connector plugs 18. A plastic identification strip 196 (FIG. 13) is adhesively bonded in a groove in the top of the index bar 186 to facilitate aligning of the tool 50 with a desired one of the terminals 24 for a wire-inserting operation.

The housing 62 and the index bar can be releasably interlocked for a wire-inserting operation by a vertical manually-releasable index latch 198. The latch 198 is pivotally mounted intermediate its ends in a vertical slot in the housing 62 and is biased by a spring 199 in a counterclodkwise direction as viewed in FIG. 11, into releasable engagement with a selected set of the index notches 194. The latch 198 can be locked in an interlocking position by a thumb screw 200 mounted on the guide member 190.

Adjacent respective opposite ends of the index bar 186, a pair of locating-and-stbilizing members 202 are mounted by suitable screws 203 and mounting lugs 204. As is best shown in FIG. 11, each locating-and-stabilizing member 202 includes a first outer depending portion 206 engageable with an outer surface of one of the ears 42 (FIG. 1) of the connector plug 18 on which the tool 50 is mounted, a central depending portion 208 receivable between the one ear and the other adjacent ear of the connector plug, a second outer depending portion 210 engageable between the latter ear of the connector plug and an ear of an adjacent previously wired connector plug, and a horizontal portion 212 having surfaces engageable with the ear of the previously wired connector plug, to mount the tool on the first-mentioned connector plug in an accurate stable condition. In this connection, opposed vertical surfaces 213 of the central depending portions 208 are engageable with opposite end surfaces of each of the connector plugs 18 between the ears 42 when the tool 50 is mounted on the plug, to retain the tool against longitudinal movement and in proper alignment with the terminal 24 (FIG. 1) of the plug.

Referring to FIG. 11, the wire insertion blade 54 is of a known design and includes a first depending relatively thick portion 214 having a wire guide groove 216 formed in its lower end for receiving one of the wires 16 (FIG. 6) to be inserted in one of the terminals 24 (FIG. 6) of the connector plug 18 upon which the tool 50 is mounted. The blade 54 further includes a central narrowed planar wire pusher portion 218 which has a shallow wire-receiving guide groove (not shown) and which is receivable in the guide slot 32 (FIG. 6) for the terminal 24. The blade 54 also includes a second relatively thick portion 220 having a suitable wire-receiving guide groove (not shown). During a wire-inserting operation, the blade portions 218 and 220 engage the wire 16 on opposite sides of the terminal 24 to push the wire into the terminal, and the terminal is received in an open-ended vertical slot 222 in the blade 54. Elongated shallow grooves 224 also are formed on opposite sides of the blade between the first depending portion 214 and the narrowed portion 218 to accommodate wire retaining ribs (not shown) on the projecting portions 34 (FIG. 1) of the connector plug 18 during the wire-inserting operation.

With further reference of FIG. 11, in accordance with this invention the central blade portion 55 of the wire slack-forming bar 56 includes a depending portion 226 to which the wire 16 extends from the camming pin 52 during a wire-inserting operation, for forming the slack portion in the wire 16 as illustrated in FIG. 8. More specifically, in preparing for the wire-inserting operation the wire is positioned in the depending portion 226 in a groove 228 having a generally reverse-curve configuration (not shown) so as to guide the wire from in alignment with the wire strain-relief slot 38 (FIG. 8) of the connector plug 18 on which the tool 50 is mounted, into an offset relationship in alignement with the terminal 24 (FIG. 8) into which the wire is to be inserted in the next connector plug. The wire 16 also is positioned in aligned upwardly inclined grooves 231 in stepped portions 230 of the second blade portion 60 of the wire slack-forming bar 56, to align the wire with the terminal 24 and its associated guide slot 32 in the next connector plug 18, by an operator holding the wire under slight tension at an angle on the order of 45°, as illustrated in FIG. 6. In this regard, as a result of the stepped configuration of the blade portion 60, a portion of the wire 16 is freely suspended between the stepped portions 230 in space and is visible to the operator using the tool 50, to facilitate the positioning of the wire in the grooves 231.

After a portion of the desired slack has been formed in the wire 16 by downward movement of the slack-forming bar 56, as the bar continues to move downward a wire pusher portion of narrowed thickness on the third blade portion 58 of the bar pushes a portion of the wire into the associated wire strain-relief slot 38 in the connector plug 18 on which the tool 50 is mounted, as illustrated in FIG. 8. At substantially the same time the stepped portions 230 of the second blade portion 60 push the freely suspended portion of the wire 16 between the stepped portions into an upper corner portion of the desired terminal guide slot 32 in the next connector plug 18, as illustrated in the same figure.

In summary, a new and improved method and apparatus have been provided for inserting wires 16 in the connector plugs 18, and for slack-dressing the wires between the connector plugs, without stretching the wires. In use (FIG. 5), one of the wires 16 initially is pulled from the supply reel 48 across the connector plugs 18 and manually positioned in a selected one of the terminal guide slots 32 of the first connector plug. The tool 50 then is seated on the first connector plug 18 as illustrated in FIG. 6, with a leading portion of the wire disposed in the wire guides 92 (FIGS. 11 and 12) and 94 (FIG. 12) beneath the wire-insertion blade 54. The wire 16 then is dressed about the offset camming pin 52, and held at an angle (e.g., 45°) to the horizontal, with the wire received in the guide grooves 228 (FIG. 11) and 231 (FIG 11) in the slack-forming bar 56.

In the seating of the tool 50 on the first connector plug 18, the spring-loaded camming pin 52 engages the connector plug and moves upward, as necessary, to permit the seating of the tool to take place. At the same time the spring-loaded safety stop 156 (FIGS. 11–13) engages the connector plug 18 and moves upward to move the hook-shpaed portion 162 (FIG. 12 and 13) thereof out of blocking relationship with respect to the actuating button 144 on the stem 164 of the air valve 138. Then, after the wire 16 has been located in the tool 50 as above-described, the trigger 140 (FIGS. 11–13) is operated to energize the air valve 138 (FIG. 11–13) and cause operation of the first air cylinder 64 (FIGS. 11–13), moving the wire insertion blade 54 downward to engage and insert the portion of the wire therebeneath in the terminal 24 of the first connector plug, as illustrated in FIG. 7.

When the plunger 68 of the first air cylinder 64 reaches the bottom of its stroke, air flows from the first air cylinder through the passages 172, 174 and 176 (FIGS. 12 and 13) in the housing 62 into the upper end of the second air cylinder 66, causing operation of the wire slack-forming bar 56 and the forming of the slack portion in the wire between the first and second connector plugs, as shown in FIG. 8. As the wire slack-forming bar 56 then reaches the lower end of its stroke in FIG. 8, the second blade portion 58 inserts the wire 16 into the wire strain-relief slot 38 of the first connector plug 18, and the upper stepped blade portions 230 (FIG. 11) of the third blade portion 60 push the freely suspended portion of the wire therebetween into the upper corner portion of the terminal guide slot 32 of the next connector plug 18. The tool 50 then is de-energized and positioned in the next connector plug 18 as illustrated in FIG. 9, and the process is repeated as illustrated in FIG. 10, with the wire insertion blade 54 inherently redressing the slack in the wire 16 between the first and second connector plugs as shown in this latter figure, as the blade dresses the wire vertically in the terminal guide slot 32. The foregoing steps then are repeated for the other connector plugs 18 in sequence, and for other wires 16 (not shown), to form the wire mult. The same procedure also may be performed to insert wires 16 in the terminals 24 on the opposite sides of the connector plugs, in the forming of the wire mult.

What is claimed is:

1. A method of wiring first and second connector plugs to produce a wire mult, which comprises the steps of:

(1) inserting a first portion of a wire into a terminal of the first connector plug;

(2) forming a slack portion in the wire between the first connector plug and the second connector plug; and (3) inserting a second portion of the wire into a strain-relief slot of the first connector plug after the first portion of the wire has been inserted in the terminal of the first connector plug.

2. The method as recited in claim 1, which further comprises:

extending a section of the wire from a wire supply across the second connector plug to the first connector plug to insert the first portion of the wire into the terminal of the first connector plug.

3. The method as recited in claim 1, which further comprises:

offset-dressing the second portion of the wire with respect to the terminal of the first connector plug to align the second portion of the wire with the wire strain-relief slot of the first connector plug prior to inserting the first portion of the wire into the terminal.

4. The method as recited in claim 1, which further comprises:

inserting a third portion of the wire into a terminal guide slot of the second connector plug after forming the slack portion in the wire.

5. The method as recited in claim 4, in which:

the second portion of the wire is inserted into the strain-relief slot of the first connector plug and the third portion of the wire is inserted into the terminal guide slot of the second connector plug, substantially simultaneously.

6. The method as recited in claim 4, in which: the third wire portion is suspended in air between two spaced wire support portions as the third wire portion is inserted in the terminal guide slot of the second connector plug.

7. Apparatus for wiring connector plugs to produce a wire mult, which comprises:

first insertion means for inserting a first portion of a wire into a terminal of a first connector plug;

means for forming a slack portion in the wire between the first connector plug and a second connector plug after the first portion of the wire has been inserted into the terminal of the first connector plug; and second insertion means for inserting a second portion of the wire into a wire strain-relief slot in the first connector plug after the first portion of the wire has been inserted into the terminal of the first connector plug.

8. Apparatus as recited in claim 7, which further comprises:

camming means, offset with respect to the first wire insertion means for inserting the first portion of the wire into the terminal of the first connector plug, for aligning the second portion of the wire with the wire strain-relief slot of the first connector plug.

9. Apparatus as recited in claim 8, in which:

the camming means is a spring-loaded guide pin.

10. Apparatus as recited in claim 8, which further comprises:

a first air cylinder for operating the first wire insertion means for inserting the first portion of the wire into the terminal of the first connector plug; and a second air cylinder for operating the wire slack-forming means and the second wire insertion means for inserting the second portion of the wire into the wire strain-relief slot in the first connector plug; and means for causing operation of the second air cylinder after the first air cylinder has been operated to insert the first portion of the wire into the terminal of the first connector plug.

11. Apparatus as recited in claim 10, in which:

the second wire insertion means inserts the second portion of the wire into the wire strain-relief slot after the slack portion has been formed in the wire by the wire slack-forming means.

12. Apparatus as recited in claim 10, in which:

the wire slack-forming means includes a first wire-engaging blade portion; and the second wire insertion means for inserting the second portion of the wire into the wire strain-relief slot of the first connector plug includes a second wire-engaging blade portion movavle with the first wire-engaging blade portion of the wire slack-forming means.

13. Apparatus as recited in claim 12, which further comprises:

a third wire-engaging blade portion, movable with the first wire-engaging blade portion of the wire slack-forming means, for inserting a third portion of the wire into a terminal guide slot of the second connector plug.

14. Apparatus as recited in claim 13, in which:

the third wire-engaging blade portion includes spaced support portions between which the third wire portion is suspended in air for an inserting operation.

15. Apparatus as recited in claim 13, in which:

the second and third wire-engaging blade portions insert the second and third portions of the wire into the wire strain-relief slot and the terminal guide slot, respectively, substantially simultaneously after the slack portion has been formed in the wire by the first wire-engaging blade portion of the slack-forming means.

16. Apparatus as recited in claim 15, in which:

the second and third wire-engaging blade portions are integrally formed with the first wire-engaging blade portion of the wire slack-forming means.

17. Apparatus as recited in claim 16, which further comprises:

an elongated nest member positionable on top of each of the connector plugs in a wire-multing operation; and a housing slidably mounted on the elongated nest member, the wire-engaging blade portions being mounted in the housing and being movable therewith for alignment with the terminals, terminal guide slots and wire strain-relief slots of the connector plugs.

* * * * *